(12) United States Patent
Saitoh et al.

(10) Patent No.: US 7,344,795 B2
(45) Date of Patent: Mar. 18, 2008

(54) FUEL CELL SYSTEM AND METHOD OF DISCONTINUING SAME

(75) Inventors: Dai Saitoh, Saitama (JP); Yoshikazu Murakami, Saitama (JP); Kenichiro Kimura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 307 days.

(21) Appl. No.: 11/088,329

(22) Filed: Mar. 23, 2005

(65) Prior Publication Data

US 2005/0214605 A1    Sep. 29, 2005

(30) Foreign Application Priority Data

Mar. 24, 2004    (JP)    ............................... 2004-086078

(51) Int. Cl.
*H01M 2/00* (2006.01)
*H01M 2/02* (2006.01)

(52) U.S. Cl. ........................... 429/34; 429/13; 429/20
(58) Field of Classification Search ................ 429/22, 429/25, 13, 39, 20, 34
See application file for complete search history.

(56) References Cited

U.S. PATENT DOCUMENTS 6,479,177 B1    11/2002    Roberts et al.
6,964,822 B2 *  11/2005    Kobayashi et al. ........... 429/25
2002/0146606 A1  10/2002    Kobayashi et al.
2003/0072984 A1   4/2003    Saloka et al.

FOREIGN PATENT DOCUMENTS

JP    2002-110213    4/2002
JP    2002-313395  * 10/2002    .................. 429/22

* cited by examiner

*Primary Examiner*—Patrick Joseph Ryan
*Assistant Examiner*—Ben Lewis
(74) *Attorney, Agent, or Firm*—Lahive & Cockfield, LLP; Anthony A. Laurentano, Esq.

(57) ABSTRACT

A fuel cell system has a fuel cell, a gas supply device and an electronic control unit. The gas supply device supplies a scavenging gas to the fuel cell. The electronic control unit controls scavenging of the fuel cell with the scavenging gas when a request for discontinuing power generation is given to the fuel cell. A humidification control device for controlling humidification of the scavenging gas and a cooling control device for controlling cooling of the scavenging gas are provided in a passage connecting the gas supply device and the fuel cell.

10 Claims, 6 Drawing Sheets

FUEL CELL SYSTEM AND METHOD OF DISCONTINUING SAME

BACKGROUND OF THE INVENTION

The present invention relates to a fuel cell system which is able to discontinue power generation of a fuel cell with efficient discharging of remaining water and a method for discontinuing the fuel cell.

A fuel cell of solid polymer type has stacked structure of some tens to some hundreds layers of unit cells. Each unit cell includes electrically conductive separators sandwiching a Membrane Electrode Assembly (MEA), which has a hydrogen electrode and an oxygen electrode that together interpose an electrolytic membrane. A fuel cell system having this type of fuel cell discharges water, which is produced by a chemical reaction between hydrogen and oxygen, into an external environment via a discharge port. When the fuel cell system works in a cold district, it has occurred that water remaining in the fuel cell system freezes after termination of power generation, which has created a fear that membrane structure of an MEA experiences damage. In order to provide protection against this, it has been practiced that when a request for termination of power generation is given, scavenging for removing residual water from a fuel cell system is carried out before power generation has not been completely discontinued.

Japanese Published Patent Application 2002-313395 discloses a technique related to a discharging apparatus which prevents freezing of water remaining in a fuel cell system. This apparatus has two passages which can be switched by a switching valve. One passage is connected to a fuel cell via a gas cooler and gas humidifier, and the other one is bypassed, being connected to the upstream of a cathode back pressure valve. In this way, when the switching valve is directed to the cathode back pressure valve, it is possible to scavenge water remaining in the vicinity of cathode back pressure valve where a minimum flow rate occurs. On the other hand, when the switching valve is switched to the other direction, it is possible to scavenge water remaining in the fuel cell.

The technique disclosed in the patent document described above has a drawback that it is not possible to efficiently discharge remaining water, which may possibly result in damage for the fuel cell system due to freezing of the water. This drawback is ascribed to the fact that scavenging is carried out with a gas of low temperature and high humidity, which has undergone the gas cooler and the gas humidifier. If the temperature of gas is low, it is difficult to discharge remaining water by evaporation. Furthermore, if the gas is highly humidified, its absorption rate decreases, by which the capacity of gas to absorb remaining water is represented.

Because the scavenging gas always passes through the gas cooler and gas humidifier, a pressure loss adversely occurs, so that it is difficult to discharge the remaining water with a sufficient pressure.

SUMMARY OF THE INVENTION

The present invention to solve the drawbacks described above seeks to provide a fuel cell system which is able to efficiently discharge remaining water when a request for discontinuing a fuel cell is given, and a method for discontinuing the fuel cell.

It is an aspect of the present invention to provide a fuel cell system comprising a fuel cell, a gas supply device and an electronic control unit. The gas supply device supplies a scavenging gas to the fuel cell. The electronic control unit controls scavenging of the fuel cell with the scavenging gas when a request for discontinuing power generation is given to the fuel cell. A humidification control device for controlling humidification of the scavenging gas and a cooling control device for controlling cooling of the scavenging gas are provided in a passage connecting the gas supply device and the fuel cell.

In the fuel cell system described above, the humidification control device, which is able to provide a scavenging gas with low humidification or without humidification, enhances removing of water by increasing an amount of water to be absorbed by the scavenging gas. In addition, because the cooling control device is able to prevent the temperature of scavenging gas from falling excessively, it is possible to efficiently remove remaining water by the scavenging gas which has desirable evaporating capability.

It is another aspect of the present invention to provide a fuel cell system further comprising a humidifying device, which is provided in the passage, for humidifying the scavenging gas. The humidification control device comprises a first bypass passage bypassing the humidifying device and a first bypass valve controlling a flow of the scavenging gas into the first bypass passage, and when the request for discontinuing power generation is given, the electronic control unit controls the first bypass valve so as to control an amount of the scavenging gas passing through the first bypass passage.

It is still another aspect of the present invention to provide a fuel cell system further comprising a cooling device, which is provided in the passage, for cooling the scavenging gas. The cooling control device comprises a second bypass passage bypassing the cooling device and a second bypass valve controlling a flow of the scavenging gas into the second bypass passage, and when the request for discontinuing power generation is given, the electronic control unit controls the second bypass valve so as to control an amount of the scavenging gas passing through the second bypass passage.

The fuel cell system described above is able to control humidification and cooling for a scavenging gas with a simple configuration. It is possible for the scavenging gas to partially bypass the humidifying device so as to reduce its amount to pass through the first bypass passage. The similar flow control is also made by the cooling device and the second bypass passage. If all the scavenging gas is bypassed, no scavenging gas passes through the humidifying device or cooling device. Because bypassing of the scavenging gas reduces a pressure loss, which occurs during the scavenging gas passing through the humidifying device and cooling device, it is possible to discharge remaining water with higher pressure.

It is yet another aspect of the present invention to provide a fuel cell system, in which the scavenging gas comprises a reactive gas which is used for chemical reaction in the fuel cell. The fuel cell system described above does not require an additional dedicated apparatus, thereby result in a reduction in manufacturing cost and a protection against an increase in required space for installation.

It is a further aspect of the present invention to provide a fuel cell system, in which the scavenging gas comprises a gas that is different from a reactive gas used for chemical reaction in the fuel cell. It is preferable to use a nitrogen gas which is supplied from a high-pressure vessel. An inert gas is meant to represent a rare gas and a gas which is deficient in reactiveness.

It is a still further aspect of the present invention to provide a method for controlling a fuel cell system, which comprises a fuel cell, a gas supply device for supplying a scavenging gas to the fuel cell and a passage connecting the gas supply device and the fuel cell. When a request for discontinuing power generation is given to the fuel cell, the method comprising the following steps is applied to the fuel cell system: (1) controlling cooling of the scavenging gas in the passage; (2) controlling humidification of the scavenging gas in the passage; and (3) scavenging the fuel cell with the scavenging gas having undergone steps (1) and (2).

Because the method described above is able to control temperature and humidity of the scavenging gas, it is possible to efficiently remove the remaining water.

DESCRIPTION OF THE PREFERRED EMBODIMENTS a. First Embodiment

An embodiment of the present invention is described with reference to the accompanying drawings. Description is given of a fuel cell system mounted on a vehicle (not shown), for example.

Figure 1:
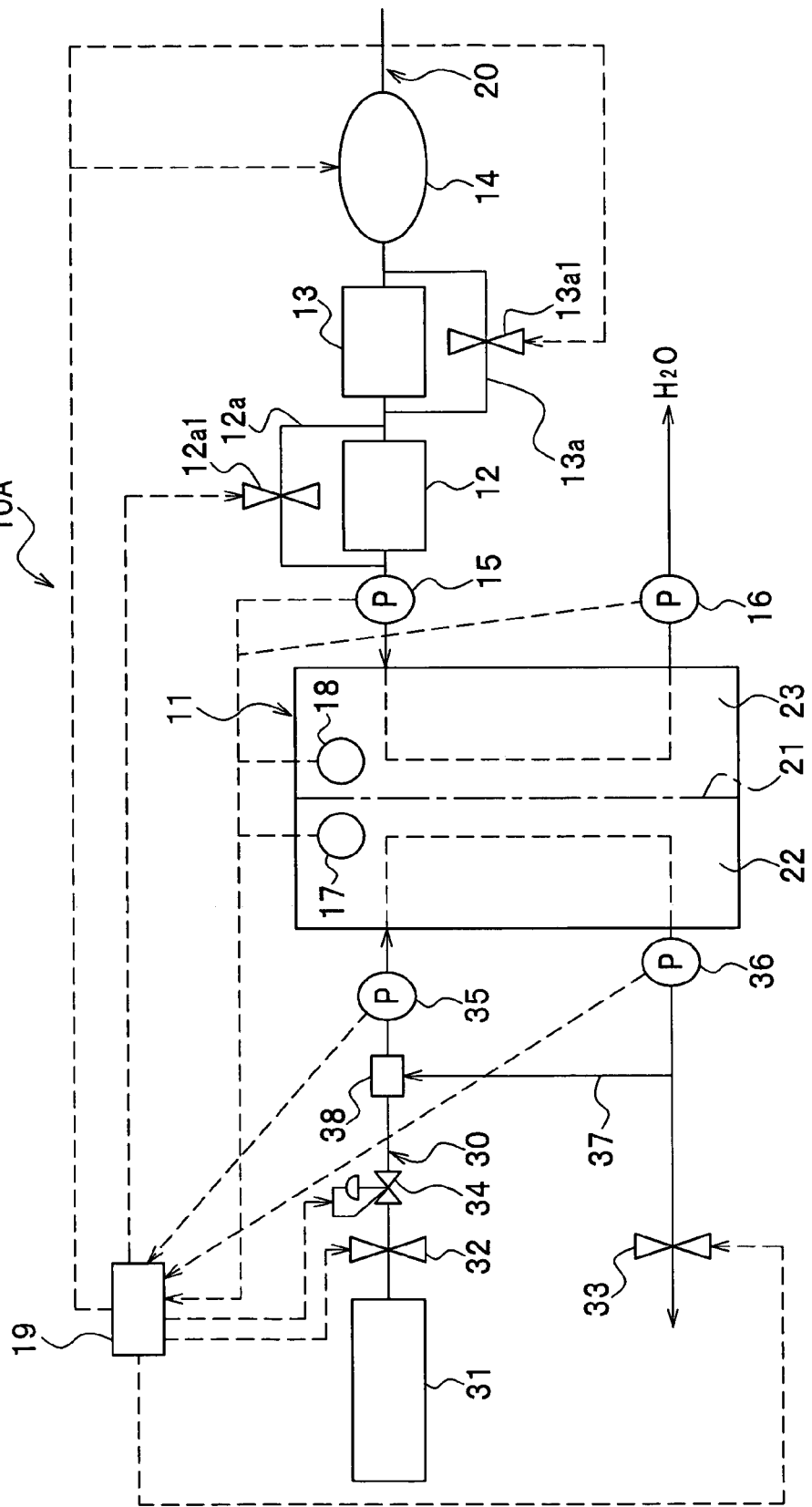
FIG. 1 is a block diagram illustrating overall structure of a fuel cell system according to the present invention.

As shown in FIG. 1, a fuel cell system 10A includes a cathode passage 20 and an anode passage 30. The cathode passage 20 supplies air (reactive gas) as an oxidant and the anode passage 30 supplies a hydrogen gas as a fuel to a fuel cell 11, respectively.

A humidifier (humidifying device) 12, an intercooler (cooling device) 13 and a supercharger (gas supply device) 14 are each connected with the cathode passage 20. The humidifier 12, the intercooler 13 and the supercharger 14 are connected to each other in series in that order relative to a cathode inlet of the fuel cell 11. The intercooler 13 cools down a compressed air to a predetermined temperature, whose temperature has risen as a result of undergoing adiabatic compression conducted by the supercharger 14. The air, compressed and subsequently cooled down, is humidified by the humidifier 12 and then sent to the fuel cell 11.

A fuel supply device 31, which is a tank charged with a highly pressurized hydrogen gas, for example, is connected with the anode passage 30. A regulating valve 34 for controlling an amount of hydrogen gas extracted from the fuel supply device 31 and a cutoff valve 32 are connected with the anode passage 30. In FIG. 1, a fuel humidifier for hydrogen gas (not shown) is connected with the anode passage 30, being located near an anode inlet of the fuel cell 11. A hydrogen gas which is humidified by the fuel humidifier is supplied to the fuel cell 11.

The fuel cell 11 has a plurality of unit cells which is stacked in a direction of the thickness of a membrane electrode assembly (MEA). A unit cell has separators (not shown) sandwiching an MEA, in which a hydrogen electrode (anode) 22 and an oxygen electrode (cathode) 23 each including a catalyst interpose a solid polymer electrolytic membrane 21 having ionic conductance. A separator, which has a hydrogen gas passage, air (oxygen gas) passage and coolant passage, is so arranged that a hydrogen gas, air and a coolant do not mix when they are supplied via the passages.

When air is supplied to the oxygen electrode 23 via the cathode passage 20 and a hydrogen gas is supplied to the hydrogen electrode 22 via the anode passage 30, the fuel cell 11 starts power generation as a result of an electrochemical reaction between hydrogen and oxygen. Current resulting from power generation is supplied to a traction motor (not shown), for example.

As shown in FIG. 1, the first embodiment introduces a first bypass passage 12a and a first bypass valve 12a1. The first bypass passage 12a bypasses the humidifier 12. The first bypass valve 12a1 controls a flow rate of scavenging gas (air) flowing into the first bypass passage 12a. Also, the first embodiment introduces a second bypass passage 13a and a second bypass valve 13a1. The second bypass passage 13a bypasses the intercooler 13. The second bypass valve 13a1 controls a flow rate of scavenging gas (air) flowing into the second bypass passage 13a. In this connection, a step motor, for example, receiving a signal sent by an electronic control unit 19 controls valve positions for the first and second bypass valves 12a1 and 13a1. The first bypass passage 12a and the first bypass valve 12a1 forms a humidification control device. Similarly, the second bypass passage 13a and second bypass valve 13a1 forms a cooling control device. Both the humidification control device and the cooling control device are disposed between the supercharger 14 and the fuel cell 11.

When a scavenging gas is supplied by a gas supply device, the supercharger 14 (compressor) for example, its temperature will rise due to adiabatic compression conducted by the supercharger 14. The temperature rise, which leads to a reduction in relative humidity of the scavenging gas, is generally preferable from the point of view of water removal. However, it is sometimes preferable to avoid using an excessively dried scavenging gas. Also, there exists a case where it is preferable to avoid using a scavenging gas whose temperature is excessively raised by the supercharger 14. Taking these possible situations into account, the first embodiment of the present invention introduces a cooling control device along with the gas supply device, which enables generating a scavenging gas with desirable temperature and humidity.

Pressure sensors 15 and 16 are attached to the cathode passage 20 of fuel cell 11. The pressure sensor 15 is located between a cathode inlet of the fuel cell 11 and the humidifier 12. The pressure sensor 16 is located near a cathode outlet of the fuel cell 11. Similarly, pressure sensors 35 and 36 are attached to the anode passage 30. The pressure sensor 35 is located near an anode inlet of the fuel cell 11 and the pressure sensor 36 is located near an anode outlet of the fuel cell 11. Furthermore, a temperature sensor 17 and a humidity sensor 18 are installed in the fuel cell 11.

When water causes an obstruction in a passage, the difference in reading between the pressure sensors 15 and 16 will be great. After the water has been discharged, the difference falls in a predetermined range of value.

Instead of the pressure sensors 15 and 16, it may be alternatively possible to use a flow meter, which is located near the cathode inlet or outlet of the fuel cell 11. The flow meter is adapted to read a nominal flow rate when the water has been discharged.

A purge valve 33, which is connected to the anode passage 30, is located on the anode outlet side of the fuel cell 11. When the purge valve 33 is opened, a hydrogen gas is discharged into an external environment. A circulation passage 37 and an ejector 38 are connected to the anode passage 30. With the help of hydrogen gas flow from the fuel supply device 31 to the fuel cell 11, the ejector 38 sucks in a hydrogen gas discharged from the fuel cell 11 and circulates it via the circulation passage 37.

The electronic control unit 19, which includes CPU, memories, input-output interfaces and electronic circuits, is electrically connected to the first and second bypass valves 12a1 and 13a1, the pressure sensors 15, 16, 35 and 36, the cutoff valve 32 and the purge valve 33, respectively. The electronic control unit 19 controls valve positions for the first and second bypass valves 12a1 and 13a1, a pressure of the supercharger 14, opening and closing of the cutoff valve 32 and a valve position for the purge valve 33.

The fuel cell 11 generates not only power as a result of electrochemical reaction between hydrogen and air (oxygen), but also water as a by-product. The water, which is mainly generated on the cathode 23 side of the fuel cell 11, is discharged into an external environment via a passage. When the fuel cell system 10A discontinues power generation immediately after receiving a request, water will remain in the fuel cell 11 and passages. If the water freezes, it may be that the solid polymer electrolytic membrane 21 of fuel cell 11 experiences damage.

When a request for discontinuing power generation is given, the fuel cell system 10A according to the first embodiment of the present invention sends air (reactive gas) compressed by the supercharger 14 toward the fuel cell 11 as a scavenging gas. Because the first embodiment uses air (reactive gas) as a scavenging gas, it is possible to provide a simple configuration without additional members, which are required when a gas other than air is adopted.

It is possible to prevent excessive cooling of the compressed air if it passes through the second bypass passage 13a so as to bypass the intercooler 13. It is also possible to prevent excessive humidification of the compressed air if it passes through the first bypass passage 12a so as to bypass the humidifier 12. As a result, it is possible to send a scavenging gas (air) with high temperature and low humidification into the fuel cell 11. In this way, the water remaining in the fuel cell system 10A can be efficiently discharged. The advantages resulting from introduction of the first and second bypass passages 12a and 13a are more specifically described below. The first bypass passage 12a provides a scavenging gas of low humidification, thereby enabling efficient removal of remaining water. The second bypass passage 13a provides a scavenging gas of high temperature, thereby allowing remaining water to easily evaporate. In addition, because the fuel cell system 10A permits a scavenging gas to partially bypass the humidifier 12 and the intercooler 13, it is possible to decrease a pressure loss, which allows a higher pressure in discharging remaining water.

Figure 2:
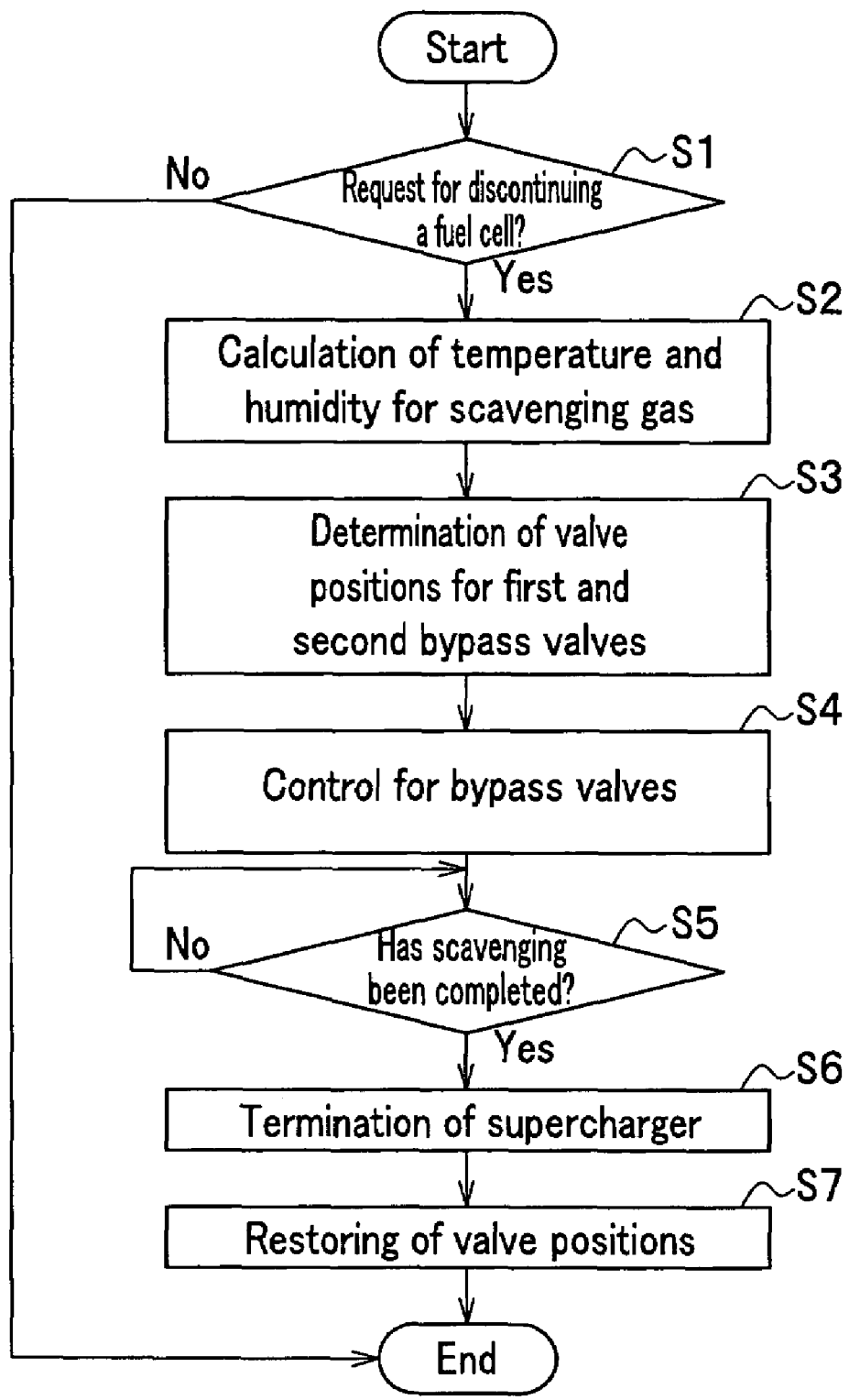
FIG. 2 is a flow chart showing steps of scavenging process conducted by a fuel cell system shown in FIG. 1

Description is given of operation of a fuel cell system with reference to a flow chart shown in FIG. 2.

As shown in FIG. 2, an electronic control unit 19 determines whether or not a request for discontinuing a fuel cell 11 is given to a fuel cell system 10A (step S1). If the fuel cell system 10A is mounted on a vehicle, this request is sent by the vehicle when an ignition switch is turned off. It should be noted that the fuel cell system 10A according to the present invention does not discontinue power generation immediately after the ignition switch is turned off, but continues power generation for scavenging. During a period of time from generation of the request to termination of power generation, the fuel cell system 10A carries out scavenging so as to remove remaining water.

If the electronic control unit 19 determines that a request is not given (NO in step S1), it halts the flow (END), waiting for another request for discontinuing power generation. If it determines that a request is given (YES in step S1), the electronic control unit 19 calculates temperature and humidity required for a scavenging gas based on current generated by a fuel cell 11 as well as temperature obtained by a temperature sensor 17 and humidity obtained by a humidity sensor 18 (step S2). In this connection, it may be possible to adopt map retrieval for the calculation in step S2.

The electronic control unit 19 determines a valve position for each of first and second bypass valves 12a1 and 13a1 (step S3) based on the temperature and humidity calculated in step S2. In the first embodiment, it is possible to control an amount of scavenging gas for each of bypass passages 12a and 13a according to a valve position of each of the first and second bypass valves 12a1 and 13a1. The electronic control unit 19 controls the first and second bypass valves 12a1 and 13a1 (step S4) based on the valve positions determined in step S3. In this way, an amount of bypassed flow for each of the first and second bypass passages 12a and 13a is controlled.

The electronic control unit 19 determines whether or not scavenging has been completed and controls a supercharger 14 so as to continue supplying a scavenging gas to the fuel cell 11 until scavenging has been completed. In this connection, it may be possible to prepare a time for conducting scavenging in advance and to determine completion of scavenging based on this time. It may also be possible for the electronic control unit 19 to determine completion of scavenging based on signals generated by pressure sensors 15 and 16. In this case, the pressure sensor 15 located near a cathode inlet generates greater value and the pressure sensor 16 located near a cathode outlet generates smaller value if water remains in the fuel cell 11. In other words, when scavenging has not been completed, a difference in pressure between the pressure sensors 15 and 16 takes a greater value. When scavenging has been completed, the difference falls in a small range.

When the electronic control unit 19 determines that scavenging has been completed based on a lapse of predetermined time (YES in step S5), the electronic control unit 19 discontinues operation of supercharger 14 (step S6) and restores the first and second bypass valves 12a1 and 13a1 to closed positions (step S7), completing scavenging (END). The scavenging gas (air) having been taken in during scavenging is discharged along with remaining water ($H_2O$) through a muffler or an independently prepared discharge port.

In this way, scavenging gas (air), which goes through the first and second bypass passages 12a and 13a for bypassing, is neither cooled by an intercooler 13 nor humidified by a humidifier 12, excessively. It is possible to obtain a scavenging gas with high temperature and low humidification which is able to efficiently remove water remaining in the fuel cell 11. Furthermore, it is possible to reduce a pressure loss of scavenging gas by letting a scavenging gas pass through the first and second bypass passages 12a and 13a so that the scavenging gas bypasses the humidifier 12 and the intercooler 13. As a result, it is possible to prevent damage for a solid polymer electrolytic membrane 21 of the fuel cell 11 due to freezing of remaining water.

It sometimes occurs in the fuel cell system 10A that water generated on an oxygen electrode 23 side moves into a hydrogen electrode 22 side through a solid polymer electrolytic membrane 21. Although the description has been given of scavenging of the hydrogen electrode (cathode), it may be possible to conduct scavenging for an anode passage 30 when a request for discontinuing power generation is given. In this case, it is preferable but not necessarily required that scavenging is carried out by not a hydrogen gas but air. If this is put into practice, a mechanism should be added, which supplies air from a cathode passage 20 to the anode passage 30. When scavenging is carried out, the electronic control unit 19 selects closing for a cutoff valve 32 so as to cut the supply of hydrogen gas and opening for a purge valve 33 so as to supply air to the anode passage 30. As a criterion for determining completion of scavenging, it is possible to adopt a lapse of predetermined time or signals generated by pressure sensors 35 and 36. In this connection, it is alternatively possible to provide a flow meter located near an anode inlet or outlet of the fuel cell 11 instead of the pressure sensors 35 and 36.

b. Second Embodiment

Figure 3:
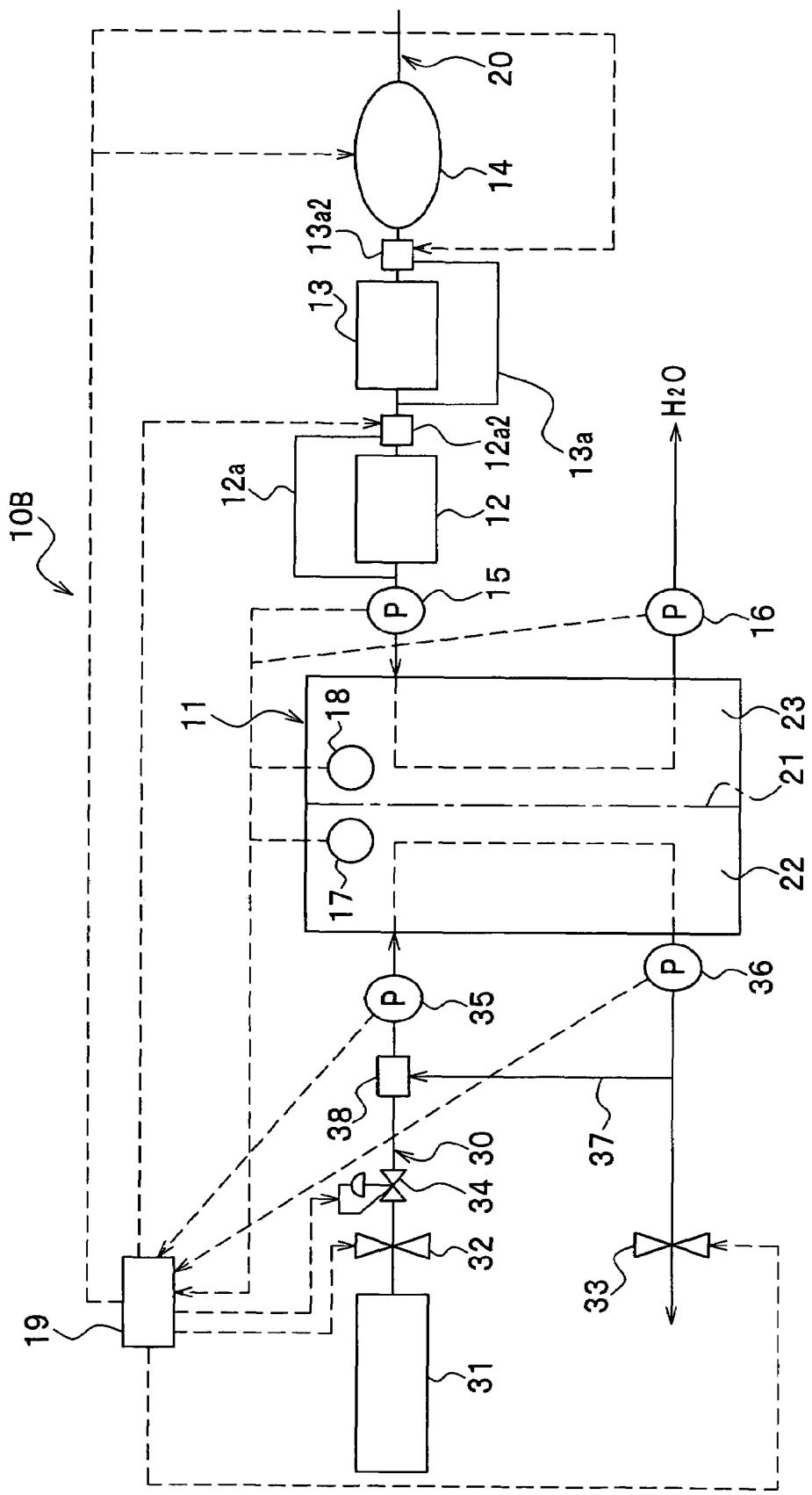
FIG. 3 is a block diagram illustrating overall structure of a fuel cell system according to the present invention.

As shown in FIG. 3, a fuel cell system 10B according to a second embodiment generally has the same structure as that of a fuel cell system 10A according to the first embodiment except for first and second three-way valves 12a2 and 13a2 replacing first and second bypass valves 12a1 and 13a1, respectively. The first three-way valve 12a2 is located at a junction of first bypass passage 12a and a cathode passage 20 near an inlet of a humidifier 12. The second three-way valve 13a2 is located at a junction of second bypass passage 13a and the cathode passage 20 near an inlet of an intercooler 13. It is assumed in the second embodiment that the three-way valves 12a2 and 13a2 are able to select a direction of flow but are not able to control flow rate. Alternatively, it may be possible to select another type of valves capable of controlling flow rate. Description will not be repeated for items which are the same as those of the first embodiment, bearing the same symbols.

Figure 4:
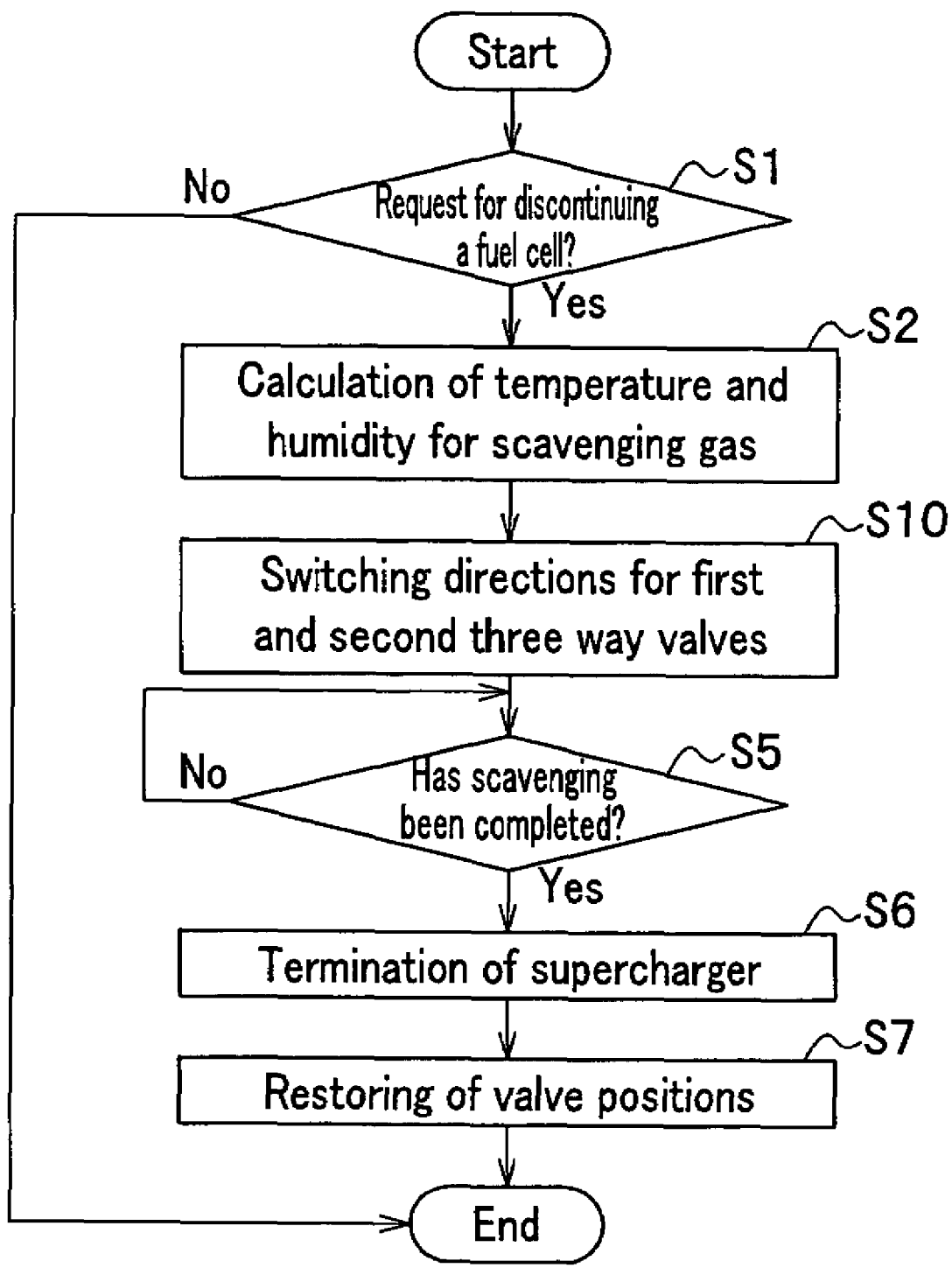
FIG. 4 is a flow chart showing steps of scavenging process conducted by a fuel cell system shown in FIG. 3

As shown in FIG. 4, when a request for discontinuing power generation is given to a fuel cell system 10B (step S1), an electronic control unit 19 calculates temperature and humidity required for a scavenging gas based on temperature obtained by a temperature sensor 17 and humidity obtained by a humidity sensor 18 (step S2). The electronic control unit 19 selectively switches directions for the first and second three-way valves 12a2 and 13a2, so that amounts of scavenging gas flowing into the first and second bypass passages 12a and 13a are controlled so as to realize the required temperature and humidity (step S10). It may be possible to switch only a direction for one of the first and second three-way valves 12a2 and 13a2. Steps subsequent to step S10 are the same as those of the first embodiment as shown in FIG. 2.

The fuel cell system 10B is also able to remove water remaining in the fuel cell 11 in a following manner. When a request for discontinuing power generation is given to the fuel cell system 10B, the fuel cell system 10B controls compressed air, which is taken in as a scavenging gas from the supercharger 14, so as to bypass the intercooler 13 and the humidifier 12. In this way, the fuel cell system 10B supplies a scavenging gas with high temperature and low humidity to the fuel cell 11.

c. Third Embodiment

Figure 5:
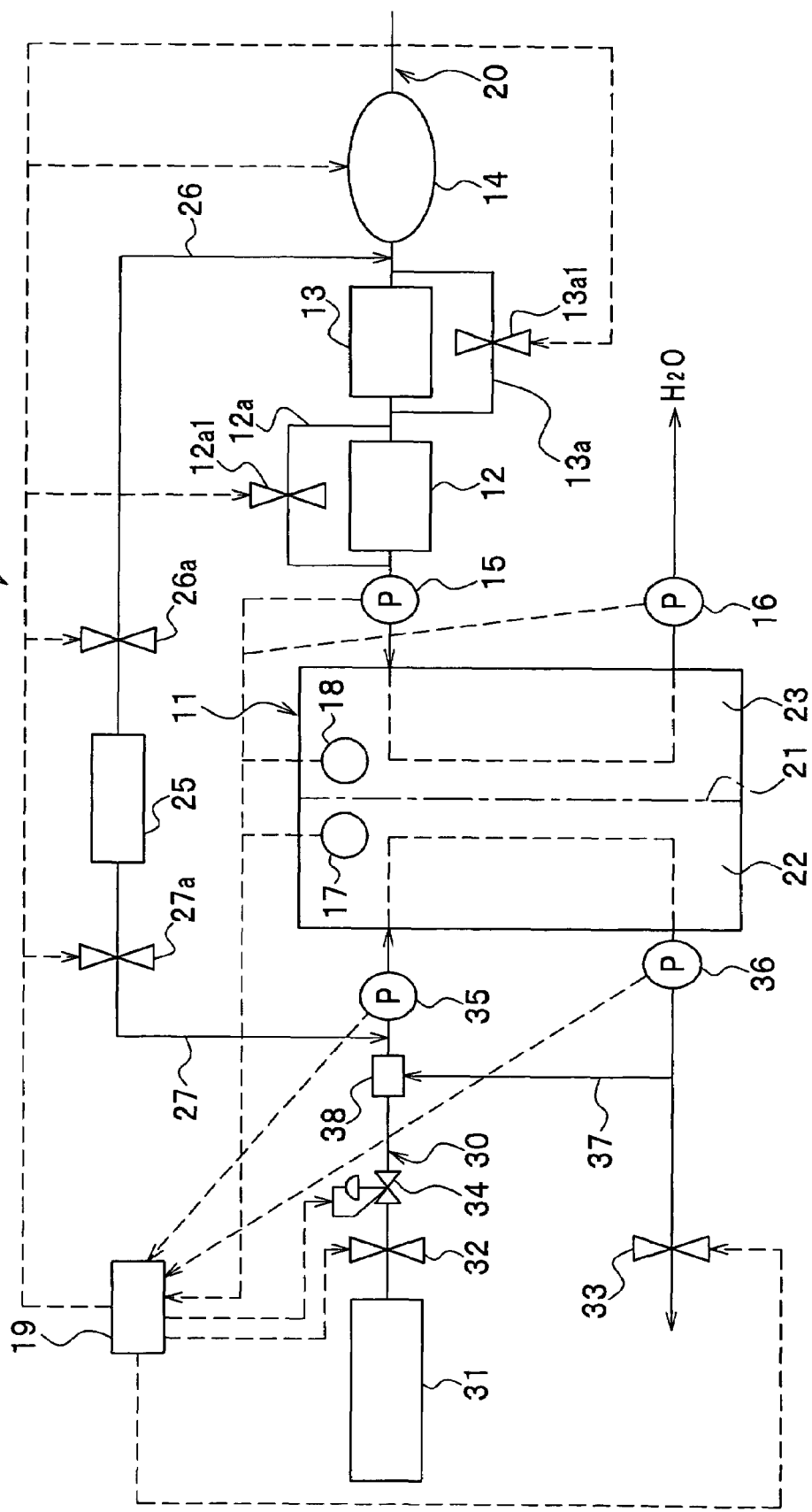
FIG. 5 is a block diagram illustrating overall structure of a fuel cell system according to the present invention.

As shown in FIG. 5, a fuel cell 10C according to a third embodiment has a scavenging gas device 25, which is charged with a gas dedicated for scavenging a fuel cell 11. In this embodiment, the dedicated gas is provided for scavenging instead of a reactive gas used for chemical reaction as described in the first and second embodiments. The scavenging device 25 is charged with a highly pressurized inert gas such as a nitrogen gas, for example.

As shown in FIG. 5, passages 26 and 27 are connected to the scavenging gas device 25 so as to supply a scavenging gas to a cathode passage 20 and an anode passage 30, respectively. A junction of the passage 26 and the cathode passage 20 is located between an intercooler 13 and a supercharger 14. A junction of the passage 27 and the anode passage 30 is located near an anode inlet of a fuel cell 11. The passages 26 and 27 have respective valves 26a and 27a for controlling a flow rate of the scavenging gas, whose valve positions are controlled by an electronic control unit 19.

Figure 6:
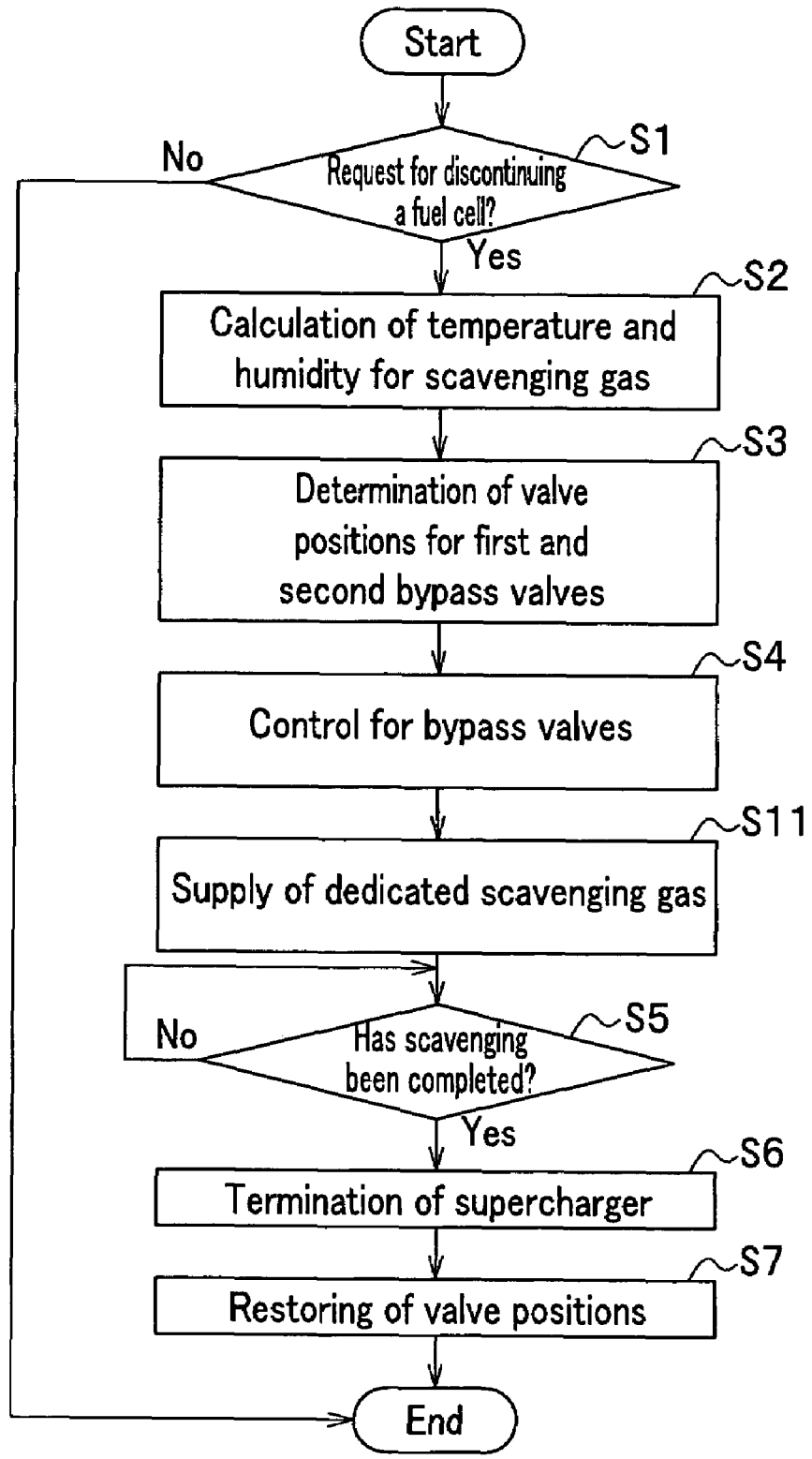
FIG. 6 is a flow chart showing steps of scavenging process conducted by a fuel cell system shown in FIG. 5

FIG. 6 is a flow chart showing steps for the third embodiment of the present invention. Compared with FIG. 2, this flow chart has an additional step S11 between steps S4 and S5 of FIG. 2. Other steps are the same as those shown in FIG. 2.

When a request for discontinuing power generation is given to the fuel cell system 10C (step S1), the electronic control unit 19 controls valve positions for first and second bypass valves 12a1 and 13a1 (steps S2-S4). Subsequently, the electronic control unit 19 controls a valve position for the valve 26a so that a compressed scavenging gas flows through both first and second bypass passages 12a and 13a. In this way, because the scavenging gas is neither cooled down by the intercooler 13 nor humidified by the humidifier 12 excessively, it is possible to scavenge the fuel cell 11 with a desirable scavenging gas.

When scavenging is carried out for a hydrogen electrode (anode) 22 side, the electronic control unit 19 closes a cutoff valve 32, controls a valve position for the valve 27a and opens a purge valve 33, so that a scavenging gas is supplied to the fuel cell 11. After scavenging has been completed, the electronic control unit 19 closes the valve 27a and purge valve 33, completing scavenging.

While the invention has been described in detail and with reference to specific embodiments thereof, it will be apparent to one skilled in the art that various changes and modifications can be made therein without departing from the spirit and scope thereof. Although description has been given of a fuel cell system mounted on a vehicle as an example, its various types of application may be possible, such as a fuel cell system mounted on means of transportation, a ship or airplane, and a stationary fuel cell system.

It may be possible to select on-off valves instead of the first and second bypass valves 12a1 and 13a1 described above, whose valve positions are controllable.

Foreign priority document, JP 2004-086078 filed on Mar. 24, 2004, is hereby incorporated by reference.

What is claimed is:

1. A fuel cell system comprising:
   a fuel cell;
   a gas supply device for supplying a scavenging gas to the fuel cell;

an electronic control unit for controlling scavenging of the fuel cell with the scavenging gas when a request for discontinuing power generation is given to the fuel cell;

a humidifying device, which is provided in a passage connecting the gas supply device and the fuel cell, for humidifying the scavenging gas;

a humidification control device comprising a first bypass passage bypassing the humidifying device to supply the scavenging gas to the fuel cell and a first bypass valve controlling a flow of the scavenging gas into the first bypass passage;

a cooling device, which is provided in the passage, for cooling the scavenging gas; and a cooling control device comprising a second bypass passage bypassing the cooling device to supply the scavenging gas to the fuel cell and a second bypass valve controlling a flow of the scavenging gas into the second bypass passage, wherein the electronic control unit controls the first bypass valve so as to control an amount of the scavenging gas passing through the first bypass passage and into the fuel cell, and wherein the electronic control unit controls the second bypass valve so as to control an amount of scavenging gas passing through the second bypass passage.

2. A fuel cell system according to claim 1, wherein the scavenging gas comprises a reactive gas which is used for chemical reaction in the fuel cell.

3. A fuel cell system according to claim 1, wherein the scavenging gas comprises a gas which is different from a reactive gas used for chemical reaction in the fuel cell.

4. A fuel cell system according to claim 1, wherein the humidification control device provides less humidification to the scavenging gas than humidification of a reactive gas, which is used for chemical reaction in the fuel cell, before the request for discontinuing power generation is given to the fuel cell.

5. A fuel cell system according to claim 1, wherein the cooling control device controls so that the scavenging gas maintains at least a minimum temperature required for power generation.

6. A method for controlling a fuel cell system, which comprises a fuel cell, a gas supply device for supplying a scavenging gas to the fuel cell and a passage connecting the gas supply device and the fuel cell, when a request for discontinuing power generation is given to the fuel cell, the method comprising the steps of:

(1) controlling cooling of the scavenging gas in the passage by having the scavenging gas bypass a cooling device through a first bypass passage;

(2) controlling humidification of the scavenging gas in the passage by having the scavenging gas bypass a humidifying device though a second bypass passage; and (3) scavenging the fuel cell with the scavenging gas having undergone steps (1) and (2).

7. A method according to claim 6, wherein step (1) is carried out by bypassing the scavenging gas.

8. A method according to claim 6, wherein step (2) is carried out by bypassing the scavenging gas.

9. A method according to claim 6, wherein step (2) provides less humidification to the scavenging gas than humidification of a reactive gas, which is used for chemical reaction in the fuel cell, before the request for discontinuing power generation is given to the fuel cell.

10. A method according to claim 6, wherein step (1) controls so that the scavenging gas maintains at least a minimum temperature required for power generation.

* * * * *